US007608209B2

(12) United States Patent
Grandjean et al.

(10) Patent No.: US 7,608,209 B2
(45) Date of Patent: Oct. 27, 2009

(54) USE OF SINTERED MIXED CARBONATES FOR THE CONFINEMENT OF RADIOACTIVE CARBON

(75) Inventors: Agnès Grandjean, Saint-Marcel-de-Careiret (FR); Gilles Leturcq, Camaret-sur-Aigues (FR); Christophe Baron, Bagnols-sur-Ceze (FR)

(73) Assignee: Commissariat a l'Energie Atomique, Paris (FR)

( * ) Notice: Subject to any disclaimer, the term of this patent is extended or adjusted under 35 U.S.C. 154(b) by 562 days.

(21) Appl. No.: 10/543,448

(22) PCT Filed: Oct. 21, 2004

(86) PCT No.: PCT/FR2004/050523

§ 371 (c)(1),
(2), (4) Date: Jul. 25, 2005

(87) PCT Pub. No.: WO2005/043554

PCT Pub. Date: May 12, 2005

(65) Prior Publication Data

US 2006/0195002 A1 Aug. 31, 2006

(30) Foreign Application Priority Data

Oct. 28, 2003 (FR) .................................. 03 12591

(51) Int. Cl.

| | |
|---|---|
| ***C01F 17/00*** | (2006.01) |
| ***C01B 31/24*** | (2006.01) |
| ***G21F 9/16*** | (2006.01) |
| ***G21C 21/00*** | (2006.01) |

(52) U.S. Cl. .................... 264/0.5; 423/263; 423/420.2; 588/2; 588/18

(58) Field of Classification Search ............. 423/420.2, 423/421, 263, 430, 432; 588/1, 2, 18; 264/0.5, 264/430, 434, 464, 219, 239
See application file for complete search history.

(56) References Cited

U.S. PATENT DOCUMENTS

| | | | | |
|---|---|---|---|---|
| 4,061,700 | A * | 12/1977 | Gallivan | 264/0.5 |
| 4,383,969 | A | 5/1983 | Bleier | |
| 5,286,468 | A * | 2/1994 | Chang et al. | 423/249 |

FOREIGN PATENT DOCUMENTS

| | | |
|---|---|---|
| EP | 0 085 809 | 8/1983 |
| EP | 0 555 996 | 8/1993 |

OTHER PUBLICATIONS

Chang, "Subsolidus phase relations in the aragoniet-type carbonates," 1971, The American Mineralogist, vol. 56, pp. 1660-1673.*

* cited by examiner

*Primary Examiner*—Wayne Langel
*Assistant Examiner*—Brittany M Martinez
(74) *Attorney, Agent, or Firm*—McKenna Long & Aldridge LLP

(57) ABSTRACT

The present invention relates to the use of a mixed carbonate of formula $AB(CO_3)_2$, in which A and B are different and chosen from alkali metals, alkaline-earth metals and rare earths, for the containment of radioactive carbon. This use may for example involve a process comprising: mixing $CO_2$ having a radioactive carbon to be contained, or a simple carbonate of an alkali, alkaline-earth or rare-earth metal having a radioactive carbon to be contained, with an aqueous solution of a mixture of $ACl_n$ and $BCl_m$ or with an aqueous solution of a mixture of $A(OH)_n$, and $B(OH)_m$ in order to obtain a precipitate of $AB(CO_3)_2$, where n and m are integers sufficient to compensate for the charge of A and B respectively; recovery of the $AB(CO_3)_2$ precipitate in powder form; and then pressing and sintering of the powder at a temperature below the decarbonation temperature of the mixed carbonate manufactured in order to obtain sintered pellets of mixed carbonates for the containment of the radioactive carbon.

12 Claims, 2 Drawing Sheets

USE OF SINTERED MIXED CARBONATES FOR THE CONFINEMENT OF RADIOACTIVE CARBON

This application is a national phase application of PCT Application No. PCT/FR2004/050523 filed on Oct. 21, 2004, which claims the benefit of French Patent Application No. 03/12591 filed on Oct. 28, 2003, which are both hereby incorporated by reference in their entirety.

TECHNICAL FIELD

The present invention relates to the use of sintered mixed carbonates for the confinement of radioactive carbon and to a radioactive carbon containment process using these mixed carbonates.

Radioactive carbon, in $^{13}C$ and essentially $^{14}C$ form, is generated during the irradiation of fuels and is discharged in gaseous form ($CO$ or $CO_2$) during the various steps in the reprocessing of spent fuels. The gaseous discharge may represent 30% of the overall radiological impact of a radioactive waste reprocessing site on the environment.

There are several methods of trapping the carbon present in the gases, all resulting in the formation of simple carbonates of the $BaCO_3$, $CaCO_3$, $SrCO_3$ or $MgCO_3$ type. The present invention uses these carbonates, which are radioactive via their carbon.

Because of its long half-life (5740 years), the contamination of the environment by $^{14}C$ lasts for many years. It is therefore necessary to have effective means for the containment of this carbon.

PRIOR ART

At the present time, only two types of matrix have been used hitherto for containing the carbon-bitumen matrices and cement matrices.

Bitumen matrices have been used for encapsulating carbonate effluents of the sodium carbon type in the case of the effluent processing from the period 1966-1971. This is therefore a proven technology. As regards the process, the safety of the bitumen-encapsulated carbonates cannot be questioned, owing to the absence of any exothermic reaction between the salt and the matrix. Although the maximum amount of carbonate incorporation into the bitumen has not generated specific tests, it is conceivable that this amount is close to that of bitumen encapsulants for radioactive sludge, i.e. about 45% by weight of the bitumen encapsulant.

However, bitumen encapsulation has many drawbacks. This is because bitumen has a low stability to irradiation, the mechanical integrity of bitumens is very poor because of its high creep, and the volume of waste generated by this matrix is very high, around 14 liters for 1 kg of carbon to be contained. Furthermore, this encapsulated material is fire-sensitive (inflammability risks), which poses a major problem in the storage of radioactive waste.

At the present time, it is general practice to use a cement matrix as matrix for the containment of carbon for carbonate encapsulation. The main advantage of a cement matrix is that it has the benefit of experiment feedback from Sellafield and from specific studies regarding the behavior of carbonates in this matrix.

However, the main drawback of this type of cement matrix is its inferior chemical durability. It has been applied in particular to the case of waste intended for a surface storage center of the type of that of ANDRA (National Agency for the Management of Radioactive Waste) in the Département of Aube.

Furthermore, in the case of large quantities to be contained, the volumes involved will be very large. The volume of waste generated by this matrix is in fact around 12 liters for 1 kg of carbon to be contained.

From the results currently available for this type of matrix, it seems that containment would be possible in calcium carbonate form in cements generally with a degree of encapsulation of between 30 and 35% by weight.

In the future it is envisioned to use fuels of the nitride or carbide type that will probably be encapsulated with SiC. The amount of carbon to be contained, which may be a mixture of $^{12}C$ and $^{13}C$, will therefore be greater.

Owing to the aforementioned drawbacks of the prior art, and the new fuels that could be used in the future, it is therefore necessary to propose containment matrices of greater efficiency in terms of volume of waste created and also if possible in terms of chemical durability.

SUMMARY OF THE INVENTION

The object of the present invention is specifically to provide a solution to the many aforementioned drawbacks of the prior art by proposing novel containment matrices that are more efficient in terms of volume of waste created and also in terms of chemical durability. The invention also makes it possible to reduce the volume of waste by at least a factor of four, and provides synthesis methods for the purpose of producing these matrices.

The present invention relates to the use of a mixed carbonate of formula $AB(CO_3)_{(n+m)/2}$, the sintering temperature of which is below the decarbonation temperature of the mixed carbonate and the hardness of which is greater than or equal to 4 on the Mohs scale, in which A and B are different and chosen from alkali metals, alkaline-earth metals and rare earths, and in which n and m are positive integers such that the charge of $AB(CO_3)_{(n+m)/2}$ is neutral, for the containment of radioactive carbon.

The present invention also relates to a radioactive carbon containment process, comprising the following steps:

a) mixing $CO_2$ having a radioactive carbon to be contained, or a simple carbonate of an alkali, alkaline-earth or rare-earth metal having a radioactive carbon to be contained, with an aqueous solution of a mixture of $ACl_n$ and $BCl_m$ or with an aqueous solution of a mixture of $A(OH)_n$ and $B(OH)_m$ in order to obtain a precipitate of $AB\,(CO_3)_{(n+m)/2}$ where A and B are different and chosen from alkali metals, alkaline-earth metals and rare earths, and n and m are positive integers such that the charge of $ACl_n$, $BCl_m$, $A(OH)_n$, $B(OH)_m$ and $AB\,(CO_3)_{(n+m)/2}$ is neutral;

b) recovering the $AB\,(CO_3)_2$ precipitate obtained in step a) in powder form;

c) optionally rinsing said powder; and d) pressing the powder and sintering it at a sintering temperature below the decarbonation temperature of the synthesized mixed carbonate in order to obtain sintered pellets of mixed carbonates of formula $AB\,(CO_3)_{(n+m)/2}$, the hardness of which is greater than or equal to 4 on the Mohs scale, and containing the radioactive carbon.

According to the invention, A and B may advantageously be chosen from Na, K, Ca, Ba, Mg and Sr. This is because these elements are easily available and are of low cost.

For the containment of the radioactive carbon in the form of $CO_2$ present in gaseous effluents, for example emanating from irradiated nuclear fuel reprocessing plants, there are various trapping processes. The most commonly employed processes are the following: double alkali process; direct hydroxide reaction process; and gas/solid process. These processes are known to those skilled in the art.

Briefly:

1) in the double alkali process, the $CO_2$ is firstly trapped in sodium carbonate form in a packing column sprayed with for example 4 N sodium hydroxide. This sodium carbonate then reacts in a reactor with calcium hydroxide in order to form calcium carbonate, which is the chemical form useful in the process of the invention for storing carbon-14. The trapping of the $CO_2$ takes place according to the following reactions:

$$2NaOH+CO_2 \rightarrow Na_2CO_3+H_2O$$

$$Na_2CO_3+Ca(OH)_2 \rightarrow 2NaOH+CaCO_3.$$

In the first step, it is possible to replace NaOH with KOH. In the aforementioned example, the solution emanating from the column is that of about 1N sodium hydroxide and 3.2 M $Na_2CO_3$. This solution then reacts with $Ca(OH)_2$ to form the insoluble calcium carbonate and to regenerate the 4N sodium hydroxide. The solution is then filtered to recover the calcium carbonate, which is preferably washed to remove the residual sodium hydroxide;

2) in the direct hydroxide reaction process, the $CO_2$ reacts directly with a hydroxide according to the reaction:

$$\frac{2}{n}M(OH)_n + CO_2 \rightarrow M_{\frac{2}{n}}CO_3 + H_2O$$

M being chosen from alkali metals, alkaline-earth metals and rare earths and n being a positive integer such that the charge of $M(OH)_n$ and of $M_{2/n}CO_3$ is neutral. M is for example chosen from Na, K, Ca, Ba, Mg and Sr. For example NaOH, $Ba(OH)_2$, $Ca(OH)_2$ and $Mg(OH)_2$;

3) in the gas/solid process, the chemical reaction used is the same as that for the process using an aqueous suspension. Only the technique whereby the reactants are brought into contact with each other is different, since for this process the gas is brought directly into contact with the solid reactant. The trapping takes place according to the reaction:

$$M(OH)_2+CO_2 \rightarrow MCO_3+H_2O$$

in which M is as defined above. The $^{14}CO_2$ is thus trapped directly in a solid. With barium hydroxide for example, trials have been carried out in a fixed bed and in a fluidized bed. Among the barium hydroxides tested, the most reactive with respect to $CO_2$ is the octahydrate $Ba(OH)_2.8H_2O$. The reaction is as follows:

$$Ba(OH)_2 \cdot 8H_2O+CO_2 \rightarrow BaCO_3+9H_2O.$$

This process has the advantage over a gas/liquid process of not requiring a liquid/solid separation.

The benefit of these processes 1), 2) and 3) is that the radioactive carbon is trapped in the form of simple carbonates, for example of the $BaCO_3$, $CaCO_3$, $SrCO_3$ or $MgCO_3$ type, which can be directly used in the present invention.

In addition, according to the invention, the simple alkali, alkaline-earth or rare-earth metal carbonate, the radioactive carbon of which is to be contained, may be obtained by trapping the radioactive carbon, in $CO_2$ form, from a gaseous effluent, said trapping being advantageously chosen from a double alkali process, a direct hydroxide reaction process and a gas/solid process.

According to the invention, a first method of implementing the process of the invention in order to manufacture sintered mixed carbonates of $AB(CO_3)_2$ type may consist in step a) of the process in making $Na_2CO_3$, for example obtained by one of the aforementioned processes, dissolved in water, react at room temperature with an aqueous solution of $ACl_n+BCl_n$, for example $CaCl_2+BaCl_2$ dissolved in water, in stoichiometric molar proportions. These proportions are for example: 2 mol of $Na_2CO_3$+1 mol of $CaCl_2$+1 mol of $BaCl_2$ give 1 mol of $BaCa(CO_3)_2$+4 mol of NaCl. The reaction is instantaneous and results in the formation of the mixed carbonate, which precipitates, and dissolved NaCl.

According to the invention, a second method of implementing the process of the invention in order to manufacture sintered mixed carbonates of $AB(CO_3)_2$ type may consist in making $Na_2CO_3$, obtained for example by one of the aforementioned processes, dissolved in water, react with an aqueous solution of $A(OH)_n+B(OH)_n$, for example $Ca(OH)_2+Ba(OH)_2$ dissolved in water, in stoichoimetric molar proportions. These proportions are for example: 2 mol of $Na_2CO_3$+1 mol of $Ca(OH)_2$+1 mol of $Ba(OH)_2$ give 1 mol of $BaCa(CO_3)_2$+2 mol of NaOH.

According to the invention, a third method of implementing the process of the invention in order to manufacture sintered mixed carbonates of $AB(CO_3)_2$ type may consist in making the $CO_2$ whose radioactive carbon is to be contained react directly with a mixture of hydroxides $A(OH)_n+B(OH)_n$, with A and B as defined above, in order to form the mixed carbonate. This reaction may be carried out for example by a gas/solid process as described above (process 3) for trapping the gaseous $CO_2$.

The next step b) of the process of the invention may consist for example in carrying out a solid/liquid separation, for example by simple filtration, so as to recover the mixed carbonate in powder form.

The powder obtained may be rinsed in step c). This rinsing is very preferably carried out with ultrapure distilled water.

The pressing and the sintering may be carried out at any sintering pressure and temperature and for any sintering time suitable for obtaining a sintered mixed carbonate, provided that the temperature is below the decarbonation temperature of the mixed carbonate synthesized. This is because, below 500° C., no sintering is observed, or the duration of the treatment is too long. Above 680° C., a decarbonation effect is observed, which opposes the expected containment.

According to the invention, for example in the case of $BaCa(CO_3)_2$, the pressing may be advantageously carried out at a pressure ranging from 10 to 20 MPa and the sintering may be advantageously carried out at a temperature ranging from 500° C. to a temperature below 680° C. for 1 to 3 hours. Preferably, the pressing may be carried out at a pressure of 14 to 16 MPa, and the sintering at a temperature of 550 to 600° C. for 1 hour 45 minutes to 2 hours 30 minutes. More preferably still, the pressing may be carried out at a pressure of 15 MPa and the sintering at a temperature of 580° C. for 2 hours.

In this example, by pressing under the aforementioned conditions of the process of the invention it is possible to obtain pellets advantageously having a densification of greater than 90%, a high hardness, between 4 and 4.5 on the Mohs scale, namely a hardness between fluorite and apatite, and a carbon content between 7 and 10% by weight for a density of 3.7, which means a volume of 3.3 liters of waste for containing 1 kg of carbon.

The process of the invention allows the radioactive carbon to be contained directly in a sintered carbonate without encapsulation. The mixed carbonates of the present invention advantageously have the following properties:

high decarbonation temperatures, greater than 300° C., in order to meet the criteria defined for storing radioactive waste;

they are not soluble in water, which prevents leaching effects;

they have a high hardness, greater than or equal to 4; and they have sintering temperatures below the decarbonation temperature of the mixed carbonate synthesized.

The volume of waste generated by a sintered carbonate according to the present invention is around 3 liters for 1 kg of carbon to be contained, depending on the carbonate used. This volume is substantially smaller than those obtained with the processes of the prior art.

Other characteristics and advantages will become apparent on reading the following examples given by way of illustration, with reference to the appended drawings.

EXAMPLES

Example 1

Case of a Mixed $BaCa(CO_3)_2$ Carbonate 21.198 g of $Na_2CO_3$ were dissolved in 1 liter of water in beaker 1;

48.85 g of $BaCl_2$+22.196 g of $CaCl_2$ were dissolved in 2 liters of water in beaker 2.

The contents of the two beakers were then mixed. A precipitate was obtained.

The precipitate obtained was filtered and then rinsed three times with ultrapure distilled water.

The powder obtained was the desired mixed carbonate, namely BaCa $(CO_3)_2$.

Figure 2:
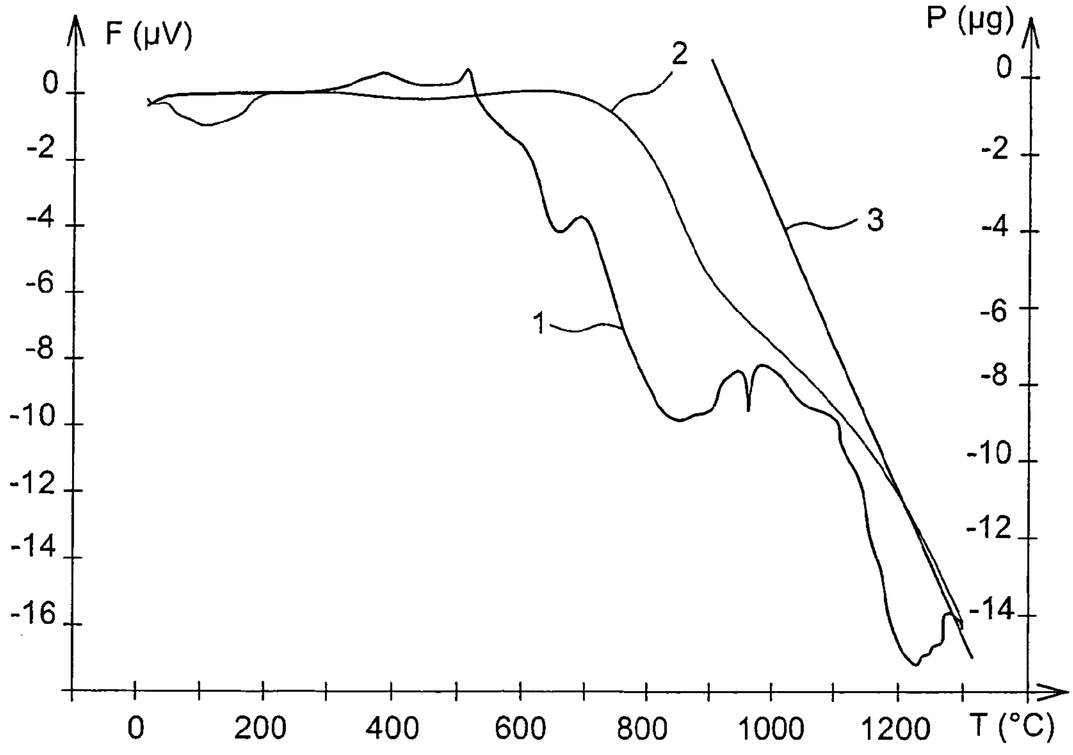
FIG. 2 is a DTA/TGA spectrum (dilatometric analyzer) showing that the decarbonation of a $BaCa(CO_3)_2$ powder starts at 680° C. Plotted on the left of this figure, on the y-axis, is the heat flux (F) in μV, and on the right the weight loss (ΔW) in μg. Curve 1 shows the differential thermal analysis (DTA) (heat flux), curve 2 shows the thermogravimetric analysis (TGA) (weight loss) and curve 3 shows the interpretation of the weight loss.

The decarbonation of this BaCa $(CO_3)_2$ powder advantageously started at 680° C., as the DTA/TGA spectrum illustrated in the appended FIG. 2 shows.

Figure 3:
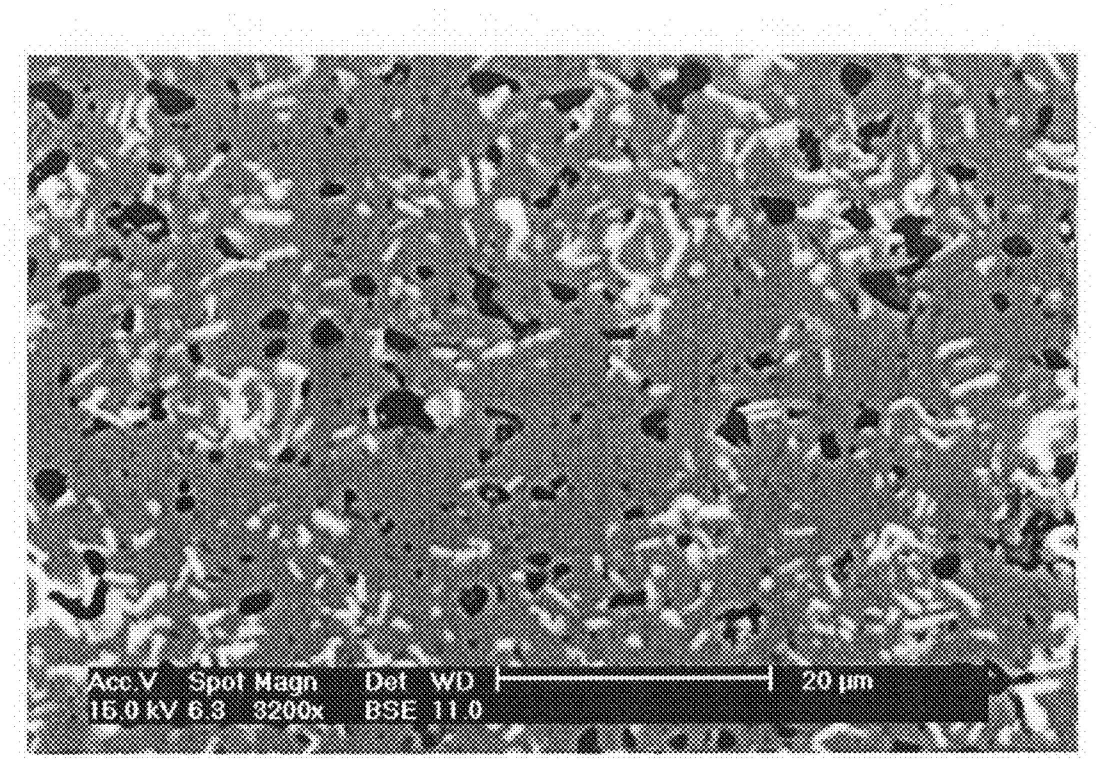
FIG. 3 is an image of a material according to the invention obtained by scanning electron microscopy. The magnification scale is indicated on the photograph.

By pressing at 15 MPa followed by natural sintering at 580° C. for 2 hours, it was possible to obtain pellets having the following properties:

a densification of greater than 90% (see FIG. 3);

a high hardness, of between 4 and 4.5 on the Mohs scale;

a carbon content of around 8% by weight for a density of 3.7, which means a volume of 3.31 of waste for containment of 1 kg of carbon; and a pKs of 8.6 at 90° C. for the reaction:

$$Ba_{1/2}Ca_{1/2}(CO_3) \Leftrightarrow \tfrac{1}{2}Ba^{2+} + \tfrac{1}{2}Ca^{2+}CO_3^{2-}.$$

These pellets were examined under a scanning electron microscope. FIG. 3 is a photograph of this examination.

Figure 1:
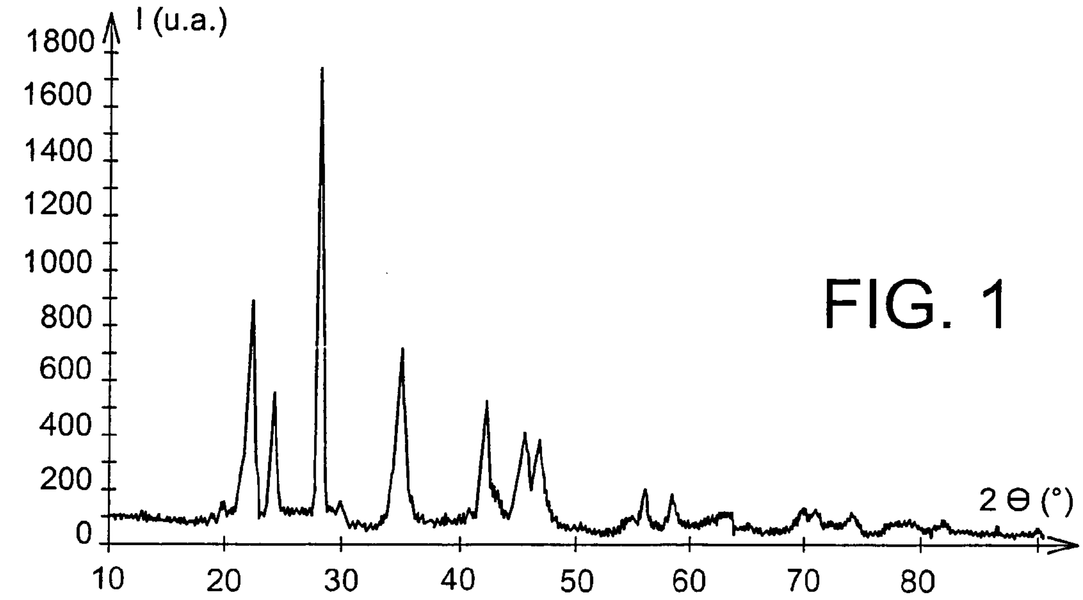
FIG. 1 is an X-ray spectrum (intensity (I) (counts) (in a.u.) as a function of the diffraction angle (2θ) of an alstonite ceramic obtained according to the present invention.

By synthesizing the $BaCa(CO_3)_2$ carbonate it is possible to obtain an alstonite ceramic having a few $BaCO_3$ impurities, as the X-ray (XRD) spectrum of FIG. 1 and the photograph obtained in scanning electron microscopy of FIG. 3 show. This ceramic, which has a much higher hardness than that of the simple carbonates $BaCO_3$ and $CaCO_3$, is obtained by natural sintering. Thus, the nonfriable material obtained can be easily handled.

The invention claimed is:

1. A radioactive carbon containment process, comprising a step of containing said radioactive carbon in a mixed carbonate of formula $AB(CO_3)_{(n+m)/2}$, the sintering temperature of which is below the decarbonation temperature of the mixed carbonate and the hardness of which is greater than or equal to 4 on the Mohs scale, in which A and B are different and chosen from the group consisting of alkali metals, alkaline-earth metals and rare earths, and in which n and m are positive integers such that the charge of $AB(CO_3)_{(n+m)/2}$ is neutral.

2. The radioactive carbon containment process as claimed in claim 1, in which A and B are different and chosen from the group consisting of Na, K, Ca, Ba, Mg and Sr.

3. The radioactive carbon containment process as claimed in claim 1, in which the mixed carbonate is $BaCa(CO_3)_2$.

4. The radioactive carbon containment process as claimed in claim 1, in which the mixed carbonate is sintered for the containment of the radioactive carbon.

5. The radioactive carbon containment process as claimed in claim 1, in which the radioactive carbon comes from a gaseous effluent of an irradiated nuclear fuel reprocessing plant.

6. A radio carbon containment process, comprising the following steps:

a) mixing $CO_2$ having a radioactive carbon to be contained, or a simple carbonate of an alkali, alkaline-earth or rare-earth metal having a radioactive carbon to be contained, with an aqueous solution of a mixture of $ACl_n$ and $BCl_m$ or with an aqueous solution of a mixture of $A(OH)_n$ and $B(OH)_m$ in order to obtain a precipitate of $AB(CO_3)_{(n+m)/2}$ where A and B are different and chosen from the group consisting of alkali metals, alkaline-earth metals, alkaline-earth metals and rare earths, and n and m are positive integers such that the charge of $Al_n$, $BCl_m$, $A(OH)_n$ and $B(OH)_m$ is neutral;

b) recovering the $AB(CO_3)_2$ precipitate obtained in step a) in powder form;

c) optionally rinsing said powder; and d) pressing the powder and sintering it at a sintering temperature below the decarbonation temperature of the synthesized mixed carbonates in order to obtain sintered pellets of mixed carbonates of formula $AB(CO_3)_{(n+m)/2}$, the hardness of which is greater than or equal to 4 on the Mohs scale, and containing the radioactive carbon in the sintered pellets of mixed carbonates.

7. The process as claimed in claim 6, in which A and B are different and chosen from the group consisting of Na, K, Ca, Ba, Mg and Sr.

8. The process as claimed in claim 6, in which the mixed carbonate is $BaCa(CO_3)_2$.

9. The process as claimed in claim 6, in which the pressing is carried out at a pressure ranging from 10 to 20 MPa, and the sintering at said temperature for 1 to 3 hours.

10. The Process as claimed in claim 6, in which the pressing is carried out at a pressure of 14 to 16 MPa, and the sintering at a temperature of 550° C. to 600° C. for 1 hour 45 minutes to 2 hours 30 minutes.

11. The process as claimed in claim 6, in which the simple carbonate is obtained by trapping the radioactive carbon, in $CO_2$ form, in accordance with a process chosen from the group consisting of a double alkali process, a direct hydroxide reaction process and a gas/solid process.

12. The process as claimed in claim 6, in which the $CO_2$ having a radioactive carbon to be contained, or a simple carbonate of an alkali, alkaline-earth or rare-earth metal having a radioactive carbon to be contained, comes from an effluent of an irradiated nuclear fuel reprocessing plant.

* * * * *